No. 868,745. PATENTED OCT. 22, 1907.
H. WOODS.
VALVE MECHANISM.
APPLICATION FILED SEPT. 28, 1906.
3 SHEETS—SHEET 1.
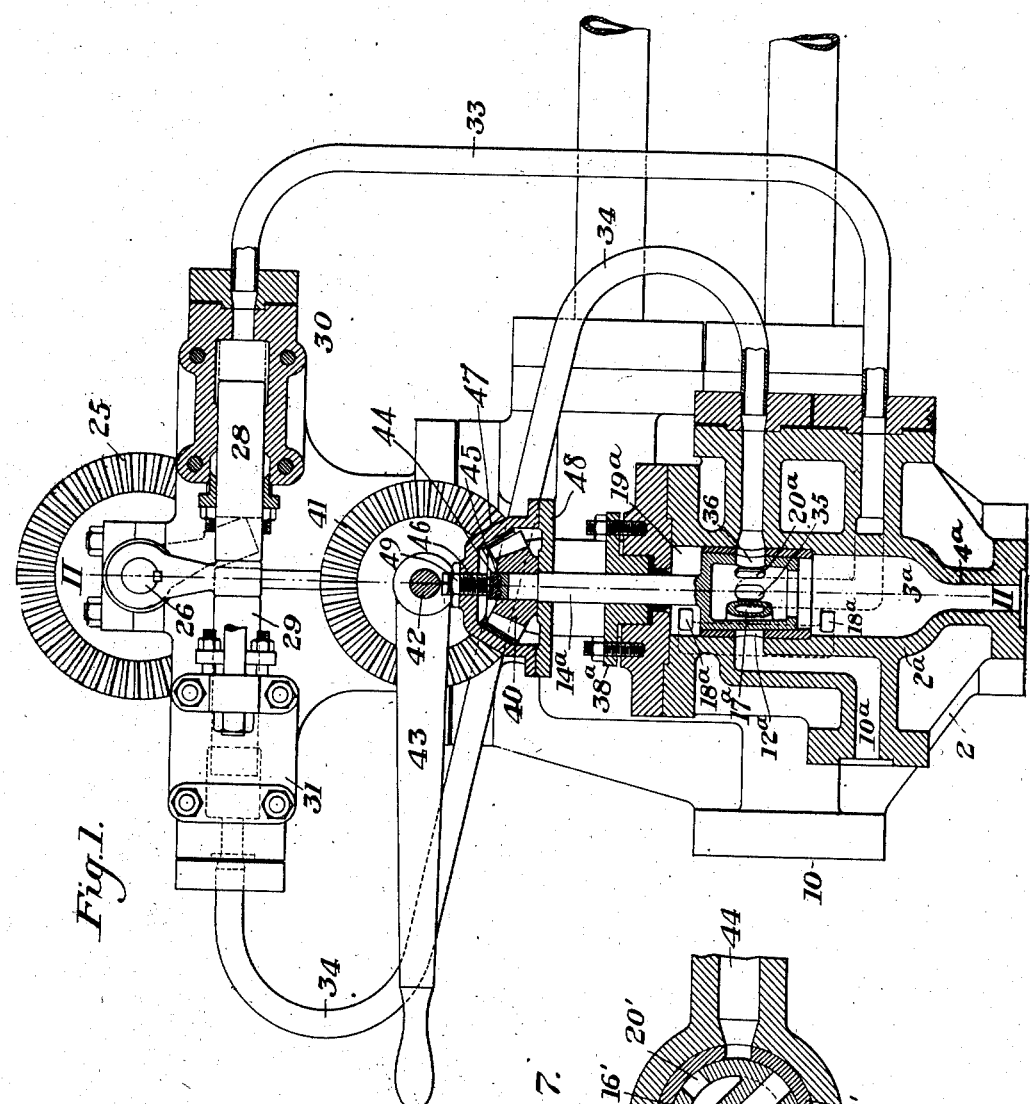
WITNESSES
INVENTOR No. 868,745.

PATENTED OCT. 22, 1907.

H. WOODS.
VALVE MECHANISM.
APPLICATION FILED SEPT. 28, 1906.

3 SHEETS—SHEET 2.

WITNESSES
R. A. Balderson
H. M. Corwin

INVENTOR
Harry Woods
by Bakewell & Byrne,
his Attys.

No. 868,745.
PATENTED OCT. 22, 1907.
H. WOODS.
VALVE MECHANISM.
APPLICATION FILED SEPT. 28, 1906.
3 SHEETS—SHEET 3.
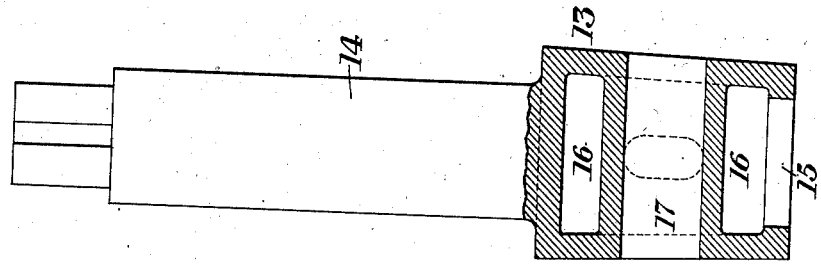
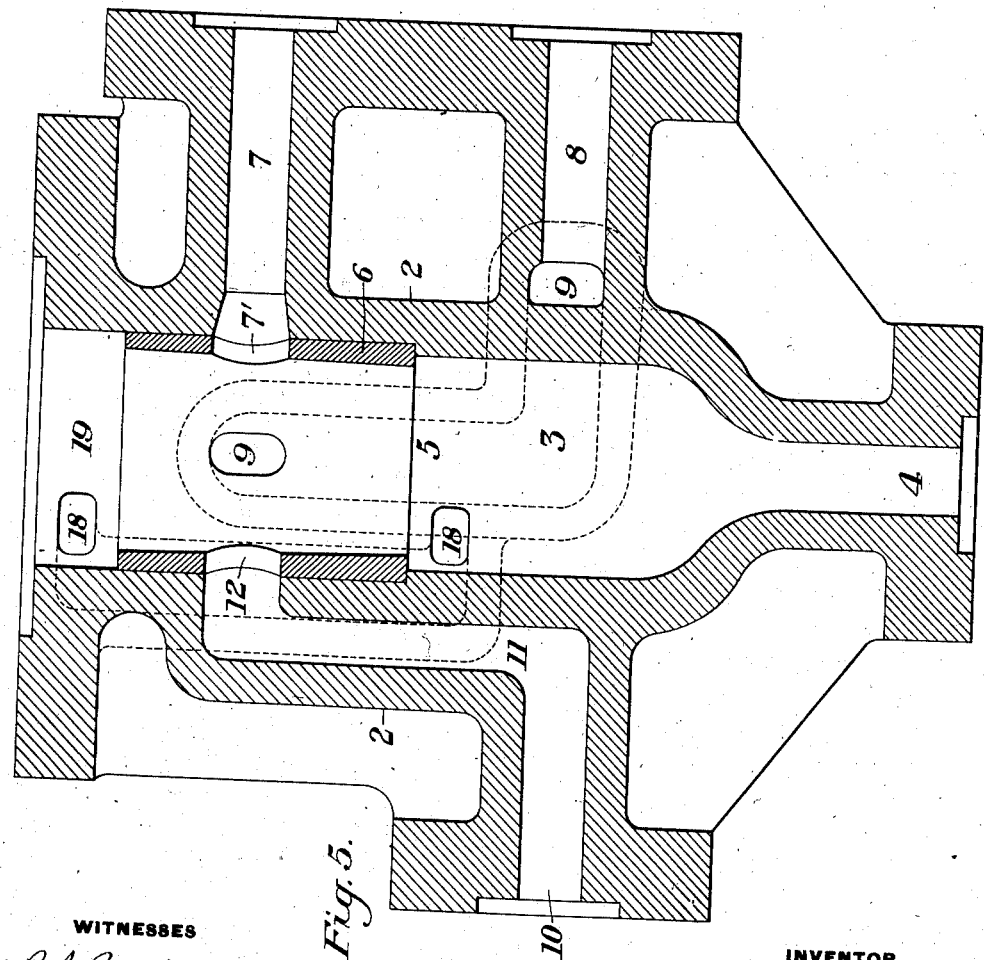
WITNESSES
INVENTOR
Harry Woods
by Bakewell & Byrne,
his attys

UNITED STATES PATENT OFFICE.

HARRY WOODS, OF STEUBENVILLE, OHIO.

VALVE MECHANISM.

No. 868,745.  Specification of Letters Patent.  Patented Oct. 22, 1907.

Application filed September 28, 1906. Serial No. 336,594.

*To all whom it may concern:*

Be it known that I, HARRY WOODS, of Steubenville, Jefferson county, Ohio, have invented a new and useful Valve Mechanism, of which the following is a full, clear, and exact description, reference being had to the accompanying drawings, forming part of this specification, in which—

Figure 3:
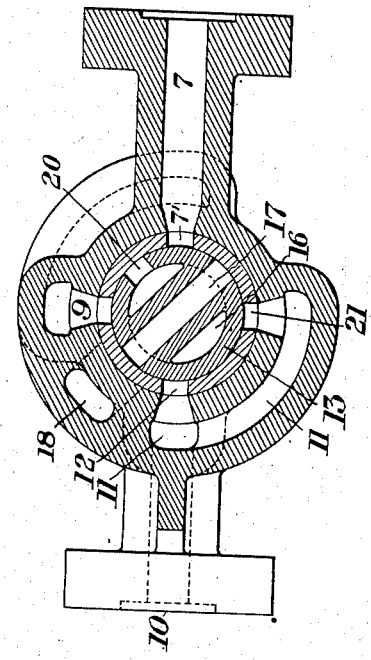
Figure 4:
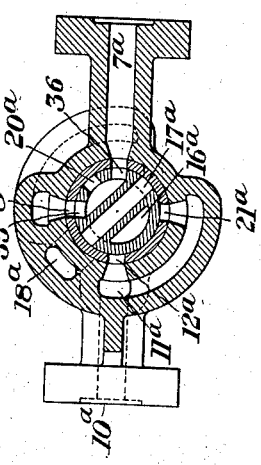
Figure 2:
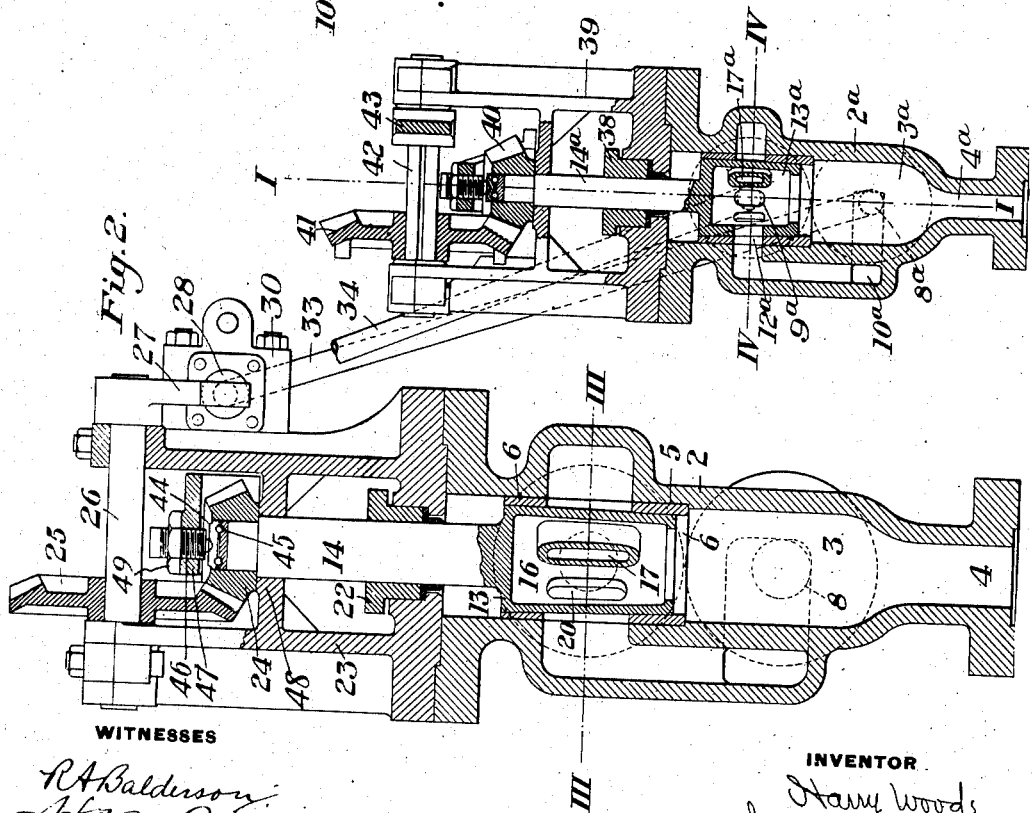

Figure 1 is a front elevation partly in section of valve mechanism embodying my invention, the portion in section being taken on the line I—I of Fig. 2; Fig. 2 is a section on the line II—II of Fig. 1; Fig. 3 is a section on the line III—III of Fig. 2; Fig. 4 is a section on the line IV—IV of Fig. 2; Fig. 5 is a vertical section through the main valve casing, with the valve removed, the plane of the section being at right angles to the plane of section of Fig. 2; Fig. 6 is a sectional detail view of the main valve; and Fig. 7 shows a modified valve.

My invention has relation to valve mechanism especially designed for use in the control of hydraulic cylinders or other hydraulic mechanism, in which the actuating fluid requires to be admitted to both ends of an actuating cylinder, and is designed to provide a simple and efficient mechanism for this purpose.

With this object in view, my invention consists in the novel construction, arrangement and combination of parts all substantially as hereinafter described and pointed out in the appended claims.

In the drawings, the numeral 2 designates the main valve casing having an admission chamber 3 into which leads from the bottom of the casing the inlet passage 4.

5 is the valve chamber which is lined with a sleeve or bushing 6, through which extend the several ports now to be described.

7 and 8 designate respectively the passages or openings in the casing, which are connected to opposite ends of the hydraulic actuating device controlled by the valve. The port or passage 7 communicates with the valve chamber 5 by means of the port 7′ while the port or passage 8 communicates with said chamber by means of the port 9 which is approximately ninety degrees from the port 7′.

10 is the exhaust passage which communicates with the exhaust passage 11 in the valve casing, said passage 11 communicating with the valve chamber 5 by means of the port 12, which is directly opposite the port 8.

13 is the main valve which is seated within the sleeve or bushing 6, and is carried by the stem 14. This valve has a bottom opening 15, which communicates with an annular chamber 16 in the valve body surrounding a diametrically extending transverse port 17.

18 is a port which connects the admission chamber 3, with a balancing chamber 19, situated above the upper end of the body of the valve 13. This port 18 and chamber 19 provide for a balancing pressure at the upper end of the valve.

The valve body 13 is also provided with a port 20, which leads outwardly from the chamber 16 through its vertical wall. In the position of the valve shown in Fig. 3, the several ports are closed. When given a partial rotation in one direction, the transverse port 17 of the valve will connect the port 9 with the exhaust passage 11, and the port 20 will connect the chamber 16 with the port of passage 7 leading to one end of the hydraulic device to be controlled, the exhaust from the other end of such device being through the ports 8, 9, 17 11 and 10. When the valve 13 is turned in the other direction from its closed position, the exhaust port 17 connects the port 7′ with the exhaust chamber 11, and the port 20 is connected with the port 9, thereby providing for the reverse circulation of actuating fluid to and from the device which is controlled.

The valve 13 is preferably actuated by means of a pilot valve 13ª through a controller now to be described.

The valve stem 14 extends through a gland 22 of a casing 23 and carries a bevel gear wheel 24 which meshes with a similar but larger wheel 25 on the controller shaft 26. This controller shaft 26 carries at one end a depending arm or tappet 27, whose free end portion extends between the adjacent ends of opposing plungers 28 and 29 of cylinders 30 and 31.

With the exception of two additional ports presently described, the pilot valve 13ª, which controls the operation of the plungers 28 and 29 is similar to the main valve 13. The casing 2ª of this valve is also similar to the casing 2 of the main valve, the port 4ª corresponding to the port 4, and the chamber 3ª corresponding to the chamber 3, the ports 7ª and 8ª corresponding to the ports 7 and 8 respectively, the port 9ª corresponding to the port 9, the exhaust chamber 11ª and exhaust port 10ª corresponding to the chamber 11 and the exhaust port 10; the port 12ª corresponding to the port 12, and the balancing port 18ª and chamber 19ª corresponding to the balancing port 18 and chamber 19. The valve has the transverse port 17ª corresponding to the port 17, and the ports 20ª and 21ª corresponding respectively to the ports 20 and 21. The position of this valve shown in Fig. 4 corresponds to the position of the valve 13, as shown in Fig. 3. When turned in one direction from this position fluid is admitted from the valve through the ports 20ª, 9ª and 8ª to the outer end of the cylinder 30 through the connecting pipe 33, the outer end of the cylinder 31 being at the same time connected through pipe 34 and ports 7ª, 17ª, 12ª and 11ª with the exhaust 10ª. In the other position of the valve 13ª, the cylinder 30 is connected with the exhaust, and pressure is admitted to the cylinder 31.

The valve 13ᵃ is provided with two additional ports 35 and 36, which in the closed position of the valve as shown in Fig. 4 connect the chamber 16ᵃ thereof with both ports 7ᵃ and 8ᵃ, thereby maintaining a pressure in both cylinders 30 and 31, which serves to lock the controller in the position to which it has been moved.

The valve 13ᵃ is manually actuated by any suitable means, preferably as follows:—Its stem 14ᵃ passes upwardly through a gland 38 of a casing 39 and carries a bevel gear wheel 40, which meshes with the teeth of wheel 41 on a shaft 42, which carries an operating lever 43.

Each of the valve stems 14 and 14ᵃ is provided at its upper end and above its actuating pinion, with a thrust-bearing 44 with interposed anti-friction members 45. The bearing 44 is adjusted to set the valve by a screw 46, seated in an arch 47, supported on a bridge piece 48. 49 designates lock nuts for locking the screw 46.

When pressure is admitted to either of the cylinders, 30 or 31, the action of its plunger against the tappet 27 rotates the shaft 26 and thereby actuates the gears 24 and 25 to turn the valve stem 14 and thereby set the valve 13 in the desired position to which the tappet 27 is moved by one of the plungers when operated. It will be apparent that when pressure is admitted to the cylinder 30 to actuate the tappet in the reverse direction, that the plunger 28 must return the plunger 29 to its original position and force the fluid in the cylinder 31 out through the exhaust passages of the pilot valve 13. This is readily done owing to the advantage in leverage which the plunger 28 obtains upon the tappet as contrasted with the opposing resistance of the plunger 29. That is to say, the plunger 38 by reason of its engagement with the upper corner of the end of the tappet has a more effective leverage thereon, in that it is acting through a longer arm, than has the plunger 29, which is in contact with the tappet at a point near the shaft 26. When the tappet has been moved to its other position and is to be moved back again by the plunger 29, that plunger has of course a similar advantage in leverage. This constitutes an important feature of the device in its practical operation.

The valve 13 is also adapted for use as a three-position valve as shown in Fig. 7. In this case it controls but one circulating port 44, the ports 9· and 21 being omitted from the bushing 6. In one position of the valve, the port 20′ (corresponding to the port 20) connects the valve chamber 16′ with the circulating port 44. In its other position, the transverse port 17′ connects the said circulating port and the exhaust 10′. 18′ is the balancing port.

The advantages of my invention consist in the simplicity of the valves and in the simple and positive action of the controller. It will be seen that both in the main valve and in the pilot valve, a single movable member effects the necessary connections, and that these valves are simple balanced valves.

Various changes may be made in the details of construction and arrangement without departing from the spirit and scope of my invention, since

What I claim is:—

1. In valve mechanism, a main valve, gearing for actuating the same, a controller for actuating the gearing, said controller having actuating plungers, and a pilot valve for controlling the operation of the plungers; substantially as described.

2. In valve mechanism of the character described, a main or controlling valve, gearing for actuating the valve, a controller for actuating the gearing, and cylinders and plungers for operating the controller, and a pilot valve for controlling the operation of said cylinders and plungers and for locking the control valve in its several positions; substantially as described.

3. In valve mechanism of the character described, a main or controlling valve, gearing for actuating the same, a controller for actuating the gearing, said controller having a tappet arm, opposed plungers arranged to act against opposite sides of the said arm, and a pilot valve for controlling the operation of the plungers; substantially as described.

4. In valve mechanism, a valve, and a controller therefor consisting of a shaft having valve actuating gear thereon, and a tappet arm secured thereto, a pair of cylinders having plungers arranged to act upon opposite sides of said arm, and means for controlling the action of the cylinders and plungers; substantially as described.

5. In valve mechanism, a controlling device having a shaft, a tappet arm on the shaft, and opposing plungers arranged to operate upon opposite sides of said tappet arm and having a differential leverage thereon; substantially as described.

6. In valve mechanism, a valve casing having an inlet port, an exhaust port, and two circulating ports, of a valve body rotatably seated in the casing, and having a chamber therein communicating with the inlet port of the casing, an outlet port from said chamber arranged to connect said chamber with the respective circulating ports in different positions of the valve, and an exhaust port extending diametrically through the valve body and arranged to connect the circulating ports with the exhaust port, said valve body also having two additional ports leading outwardly from its chamber and arranged to connect the said chamber with both circulating ports in an intermediate position of the valve; substantially as described.

In testimony whereof, I have hereunto set my hand.

HARRY WOODS.

Witnesses:
JOHN MILLER,
H. M. CORWIN.